United States Patent [19]
Fisher et al.

[11] Patent Number: 5,855,507
[45] Date of Patent: Jan. 5, 1999

[54] METHODS OF POST-SLAUGHTER HANDLING AND CUTTING A CARCASE

[75] Inventors: Keith Donald Fisher, Beds; Robert Edward Smith, Northampton; Alastair Cuthbertson, Herts, all of Great Britain

[73] Assignee: Meat and Livestock Commission, Milton Keynes, United Kingdom

[21] Appl. No.: 737,609
[22] PCT Filed: May 15, 1995
[86] PCT No.: PCT/GB95/01091
   § 371 Date: Nov. 18, 1996
   § 102(e) Date: Nov. 18, 1996
[87] PCT Pub. No.: WO95/31109
   PCT Pub. Date: Nov. 23, 1995

[30]     Foreign Application Priority Data

May 18, 1994 [GB] United Kingdom .................... 9409964

[51] Int. Cl.⁶ .................................................. A22C 17/02
[52] U.S. Cl. .......................................... 452/149; 452/167
[58] Field of Search ................................. 452/149, 166, 452/167

[56]         References Cited

U.S. PATENT DOCUMENTS

| | | | |
|---|---|---|---|
| 3,210,802 | 10/1965 | Gray | 452/149 |
| 3,916,484 | 11/1975 | Kennedy | 452/159 |
| 3,940,998 | 3/1976 | Sourby | 452/160 |
| 5,464,368 | 11/1995 | White, et al. | 452/149 |
| 5,626,515 | 5/1997 | Krogh | 452/160 |

*Primary Examiner*—Willis Little
*Attorney, Agent, or Firm*—Sterne, Kessler, Goldstein & Fox P.L.L.C.

[57]            ABSTRACT

Methods of post-slaughter handling a carcase are presented in a first example a carcase is hung from its symphysis pubis and cut by; (1) removing the knuckle, fillet end and chump from the rest of the carcase; and, (2) separating the knuckle from the fillet end and chump by cutting at an angle of less than 45° to the back line of the carcase. In a second example the carcase is hung from its symphysis pubis and cut by; (1) removing the leg and chump from the rest of the carcase; (2) removing at least the pelvic bones; (3) straightening the leg. In a further example, the method comprises (1) hanging the carcase from its symphysis pubis; and (2) applying high voltage stimulation to the carcase.

35 Claims, 16 Drawing Sheets

EFFECT OF SLAUGHTER PERIOD ON TENDERNESS SCORE

EFFECT OF SLAUGHTER PERIOD ON OVERALL ACCEPTIBILITY SCORE

TRADITIONAL

AITCH BONE RE-SUSPENDED

AITCH BONE SUSPENDED

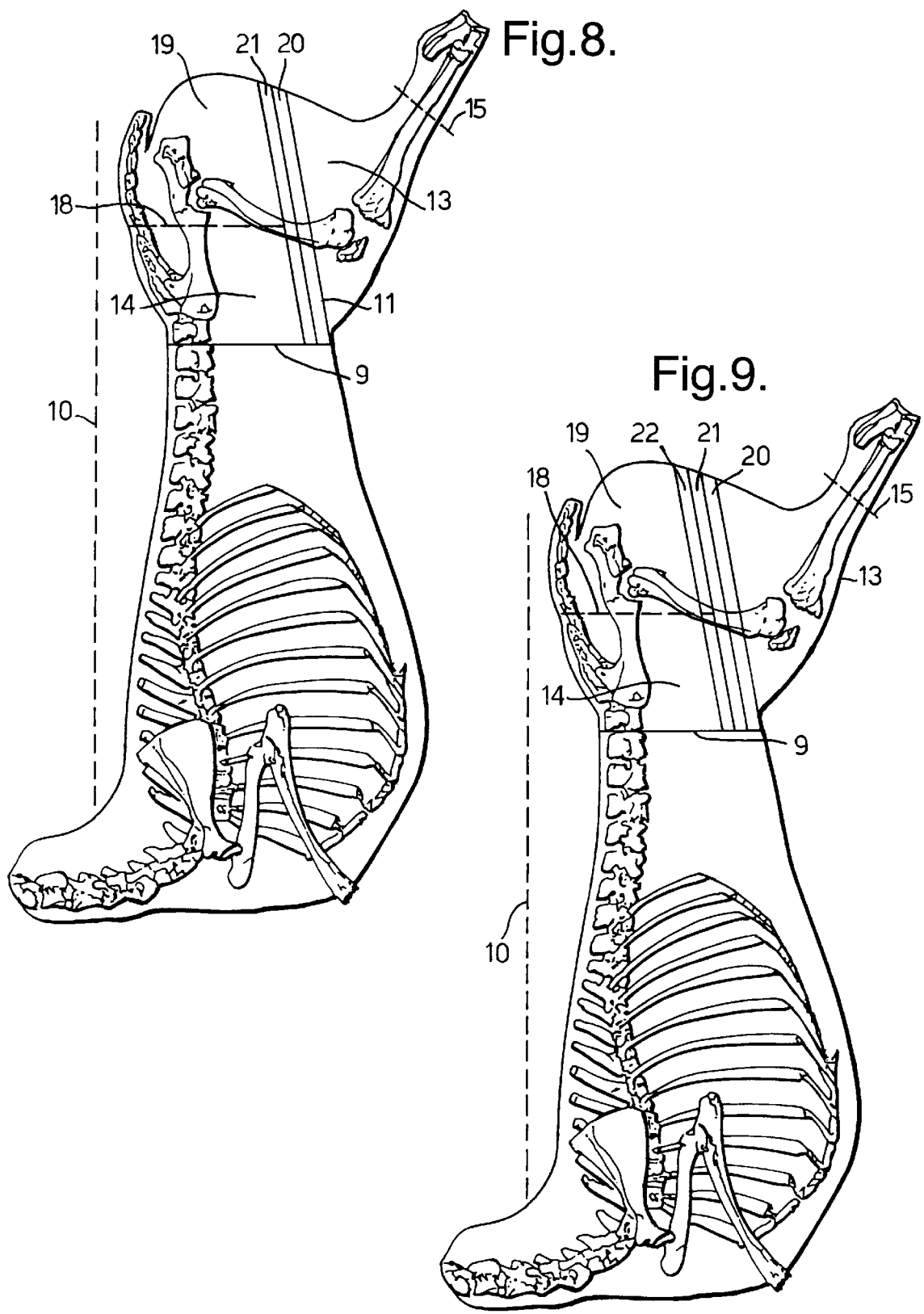

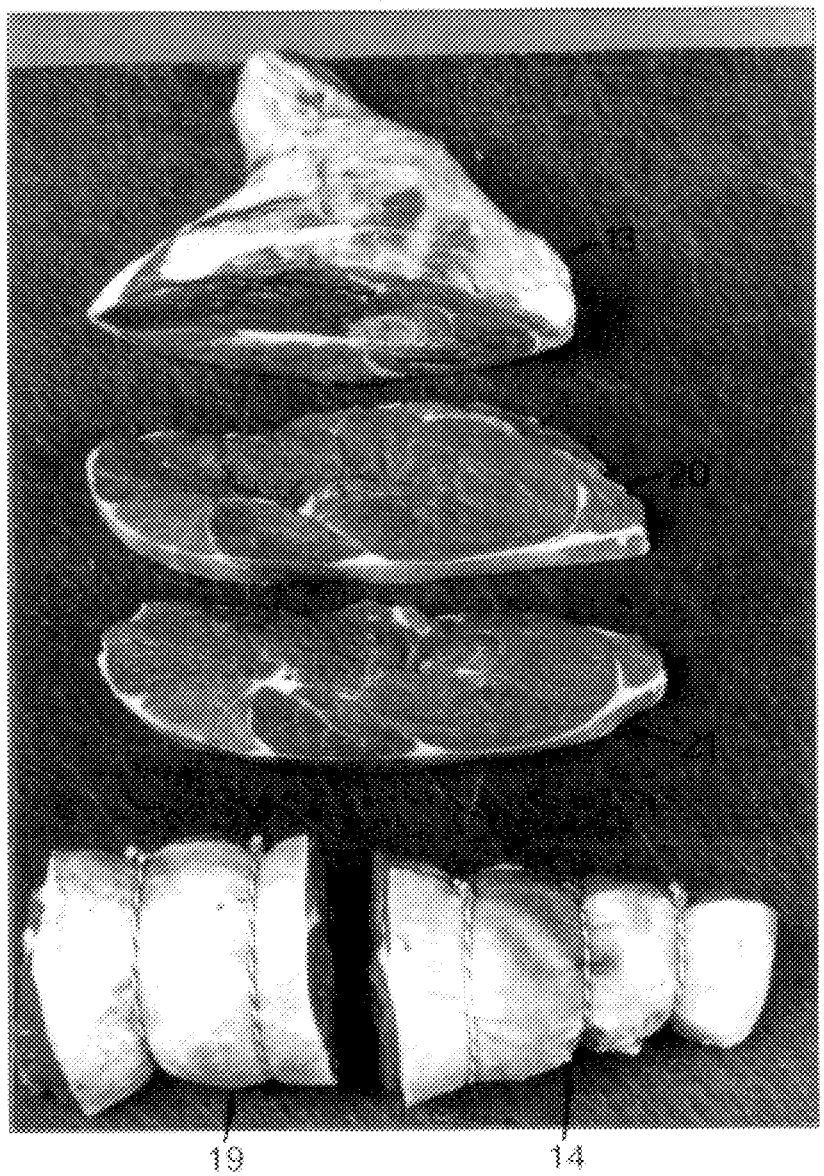

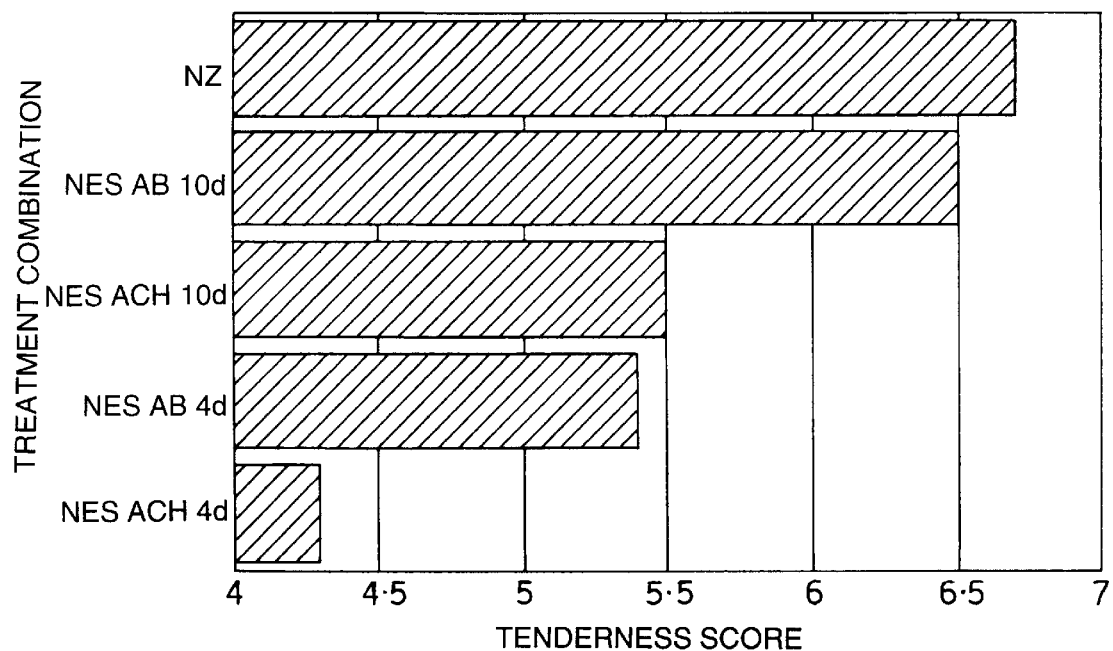
Fig. 13. HOGGET TRIAL
GRILLED LOIN CHOP-TENDERNESS SCORE
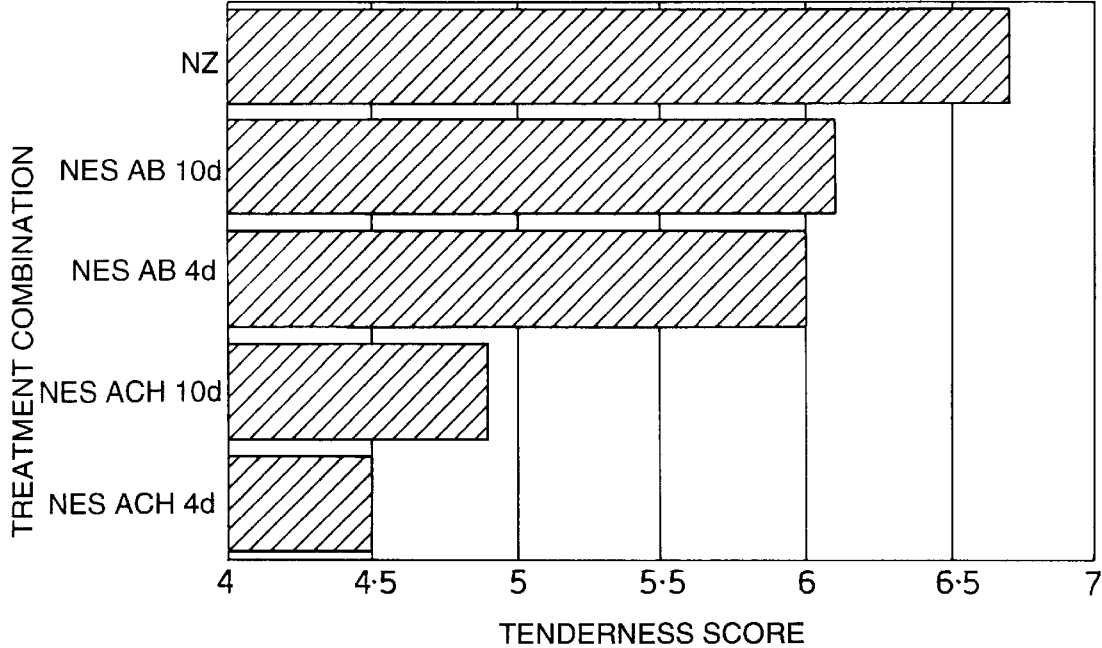
Fig. 14. HOGGET TRIAL
ROAST LEG JOINTS - TENDERNESS SCORE

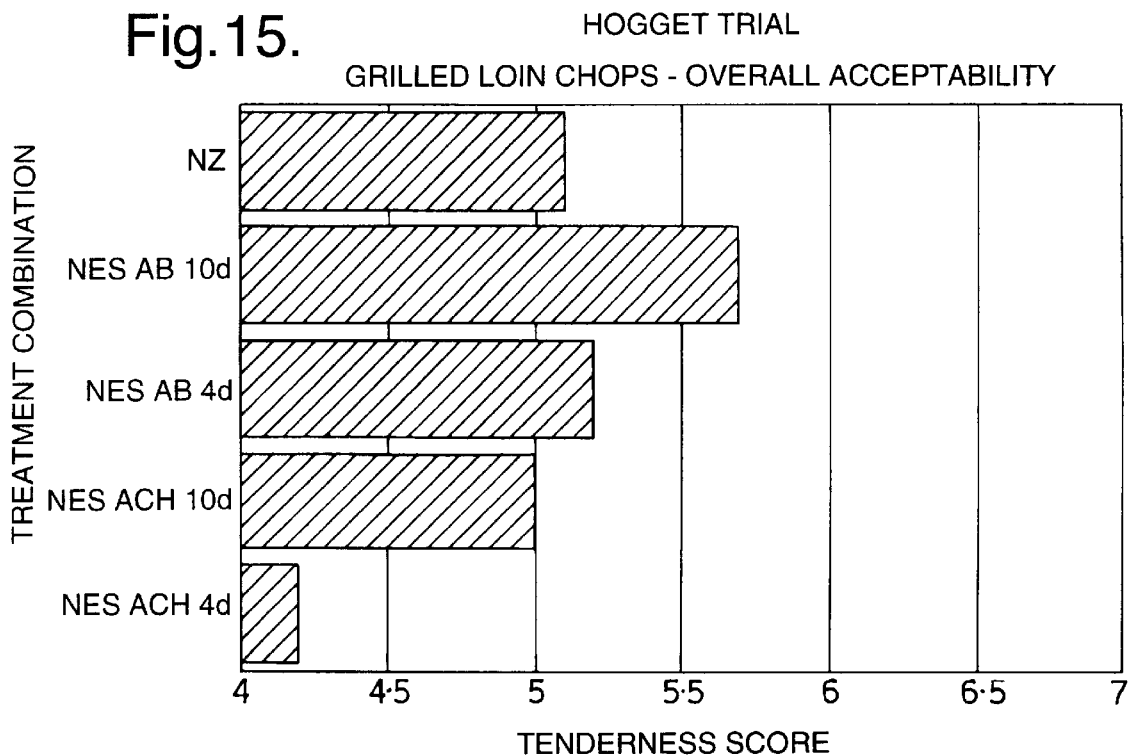
Fig. 15. HOGGET TRIAL
GRILLED LOIN CHOPS - OVERALL ACCEPTABILITY
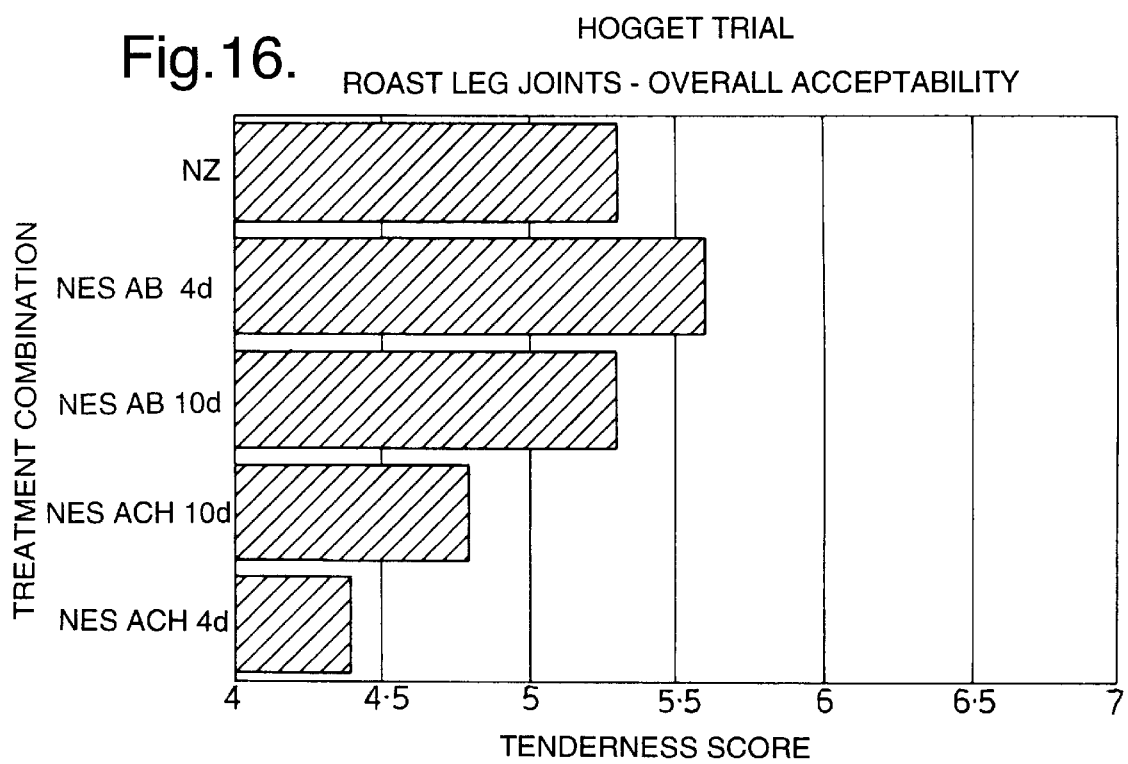
Fig. 16. HOGGET TRIAL
ROAST LEG JOINTS - OVERALL ACCEPTABILITY

LEG JOINTS

METHODS OF POST-SLAUGHTER HANDLING AND CUTTING A CARCASE

The present invention relates to methods of post-slaughter handling and cutting a carcase. The carcase may be cow, pig, sheep, goat, deer or any other suitable animal.

The present invention is applicable to the handling and cutting of a wide variety of species, but in general the description will be limited to the example of lamb. This should not be taken as limiting the applicability of the invention in any way.

Some meat causes negative retailer and consumer attitudes because it is tough to eat. In the case of lamb, toughness is found most commonly in older lambs. Most lambs are born in the Spring and towards the end of the year of birth and early in the following year they become tougher. This is illustrated in FIGS. 1 and 2. FIG. 1 shows the effect of slaughter period on tenderness score. Tenderness score is a value that is assigned varying from 1 (extremely tough) to 8 (extremely tender). As can be seen, there is a generally downward trend in tenderness of lamb sold after September. FIG. 2 shows a similar trend in the overall acceptability score, which ranges from 1 (extremely unacceptable) to 8 (extremely acceptable).

In addition, changing consumer requirements for different sized portions and speed of cooking makes some conventional cuts of lamb less attractive to some consumers, particularly when associated with the increased price position of lamb vis-a-vis other meats. There is a need, therefore, to devise cutting techniques which increase consumer choice and convenience and represent better value for money.

Conventionally, carcases are hung from the achilles tendon or hock. An alternative to conventional hanging is to hang the carcase before the onset of rigor mortis (typically within one hour of stunning) from the symphysis pubis (otherwise known as the "aitch bone"). This results in a different carcase shape in which the hind legs drop to a position perpendicular to the long axis of the body. This is known to result in improved tenderness, as discussed for example in "A Physical Method To Increase Tenderness In Lamb Carcases" Quarrier, E., Carpenter, Z. L. and Smith, G. C. 1972 Journal of Food Science, Vol. 37. In this paper, the carcases are aged for up to 48 hours from the time of slaughter.

FIG. 3 shows the positions of traditional retail joints, including leg joints from a conventionally hung lamb carcase (hung from the achilles tendon). The shank/knuckle is removed by a cut (4). Typically, the angle (6) between the cut (4), and a line (7) perpendicular to the back line (5) is less than 45°. However, these traditional cuts are not particularly suitable for the chump and hind leg of an aitch bone hung carcase.

Known cutting techniques for aitch bone hung beef or lamb generally attempt to simulate the traditional cuts as applied to a traditionally hung carcase (i.e. hung from the achilles tendon). FIG. 19 shows a conventional technique of cutting an aitch bone hung lamb carcase. The leg and chump are removed from the rest of the carcase by a first cut 40. A number of cuts 41*a–d* are then made parallel to the cut 40, to produce a number of "bone in" chops. The size of the leg joint 42 is then reduced by removing a number of steaks 43*a–d* after removing the tip 44 of the aitch bone. This cutting technique does not fully exploit the changed shape of the carcase due to aitch bone hanging, and only produces small steaks 43*a–d*.

FIG. 19A is a photograph of the leg of a lamb carcase which has been aitch bone hung and cut according to the technique shown in FIG. 19. FIG. 19A shows the leg joint 42, three "bone in" chops cuts produced by cuts 41*a–c* and two small steaks 43*a*, 43*b*.

In accordance with a first aspect of the present invention, we provide a method of cutting a carcase which has been hung from its symphysis pubis comprising the steps of:

(1) removing the knuckle, fillet end and chump from the rest of the carcase; and, (2) separating the knuckle from the fillet end and chump by cutting at an angle of less than 45° to the back line of the carcase.

In accordance with a second aspect of the present invention, a method of post slaughter handling and cutting a carcase comprises the steps of:

(1) hanging the carcase from its symphysis pubis;

(2) removing the knuckle, fillet end and chump from the rest of the carcase; and, (3) separating the knuckle from the fillet end and chump by cutting at an angle of less than 45° to the back line of the carcase.

Typically, the back line is defined as being a line at right angles to the dorsal edge of the lumbar vertebrae.

The carcase may be any species, but is typically a lamb carcase.

The first and second aspects of the invention exploit the improved and more compact shape which is assumed by the hind legs when the carcase has been aitch bone hung.

Typically, the knuckle, fillet end and chump are removed by a cut approximately perpendicular to the backline between two vertebrae (for instance last and second last lumbar vertebrae).

Typically, the femur is cut in step (2) at a narrow point between its distal and proximal ends. Preferably, the femur is cut at a position between the middle and distal thirds of the femur.

After performing the cuts according to the first or second aspects of the invention, several conventionally sized joints or combinations of joints and steaks may be produced.

For instance, one or more steaks may be removed from the fillet end and chump. The bones from the fillet end and chump are removed (using the tunnel boning method where appropriate), and one or more steaks are removed by cutting substantially parallel with the cut surface which results from step (2). This produces a much larger steak than can be cut from a traditionally hung carcase.

Typically, the method further comprises removing the distal end of the tibia, fibula and tarsal bones, removing the tail (coccygeal), aitch (pelvic) bone, sacrum and lumbar vertebrae and then removing the remaining bones by tunnel boning.

Typically, the joint is then tied securely and the chump and fillet end portion may then be divided into two or more joints by cutting at right angles to the back line of the carcase.

There may be a requirement for more traditional cuts, whilst retaining the advantages (in terms of tenderness and overall acceptability) of an aitch bone hung carcase.

In accordance with a third aspect of the present invention, we provide a method of post-slaughter handling and cutting a carcase which has been hung from its symphysis pubis comprising the steps of:

(1) removing the leg and chump from the rest of the carcase;

(2) removing at least the pelvic bones; and (3) straightening the leg.

In accordance with a fourth aspect of the present invention, a method of post slaughter handling and cutting a carcase comprises the steps of:

(1) hanging the carcase from its symphysis pubis;
(2) removing the leg and chump from the rest of the carcase;
(3) removing at least the pelvic bones; and
(4) straightening the leg.

The third and fourth aspects of the invention give the improved eating qualities which result from aitch bone hanging, whilst the straightened leg and chump have a more traditional shape, allowing them to be cut using conventional techniques.

Typically, the method further comprises removing the tail, sacrum and lumbar vertebrae. Preferably, the leg is straightened by positioning the anterior surface of the leg on the edge of a firm surface with the posterior surface of the leg uppermost, holding the posterior surface firmly and applying downward pressure on the distal end of the leg.

Again, this handling technique is applicable to a number of species, but is particularly suited to lamb.

Typically, the methods according to first to fourth aspects of the invention further comprise allowing the carcase, or cuts derived from the carcase to age for at least 72 hours from the time of slaughter.

Detailed studies have shown that by allowing the carcase or cuts to age for at least 3 days, improved eating qualities result. Post mortem changes in the muscle (known as conditioning, maturing or ageing) results particularly in improved tenderness. Typically, the carcase or cuts are aged for between 3 days and 12 weeks.

In a preferable embodiment, they are aged between 4 and 10 days, typically 7 days.

The methods according to the first to fourth aspects of the invention result in very clear benefits for improved tenderness and overall acceptability, and also results in a favourable comparison with samples of conventionally hung chilled lamb.

Preferably the method further comprises applying high voltage stimulation to the carcase.

High voltage stimulation in combination with aitch bone hanging has also been shown to provide improved eating qualities. This method is suited to any carcase, for instance beef or sheep.

The combination of aitch bone hanging the carcase with the cutting techniques according to the present invention and ageing and/or high voltage electrical stimulation results in a number of conveniently sized cuts, with improved tenderness and eating qualities.

Some examples of methods according to the present invention will now be described and contrasted with conventional techniques with reference to the accompanying figures, in which:

FIG. 8 illustrates a second cutting method according to the first and second aspects of the invention;

FIG. 8A is a photograph of a leg and chump from a lamb carcase which has been cut by the second cutting method;

FIG. 9 illustrates a third cutting method according to the first and second aspects of-the invention;

Figure 11A:
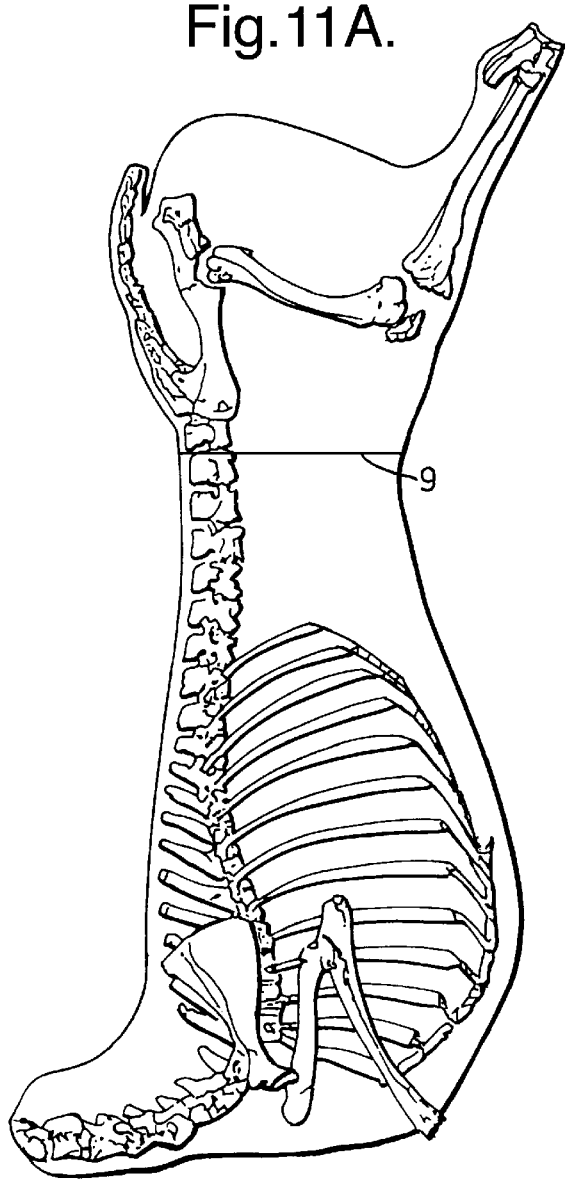
Figure 11B:
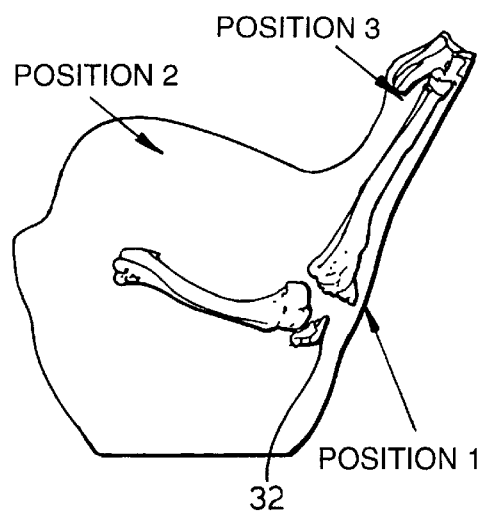
Figure 11C:
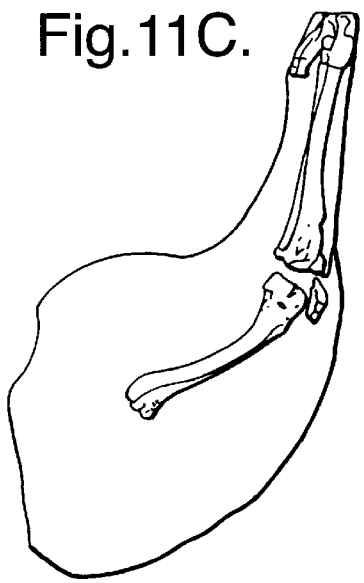
Figure 11D:
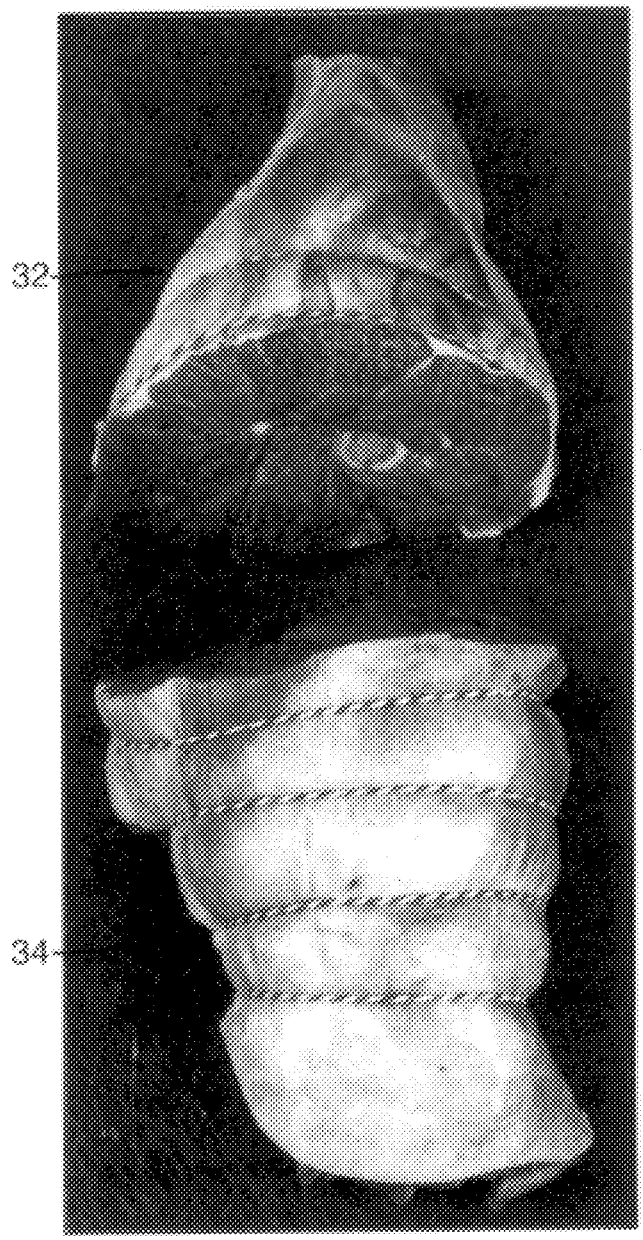
Figure 12:
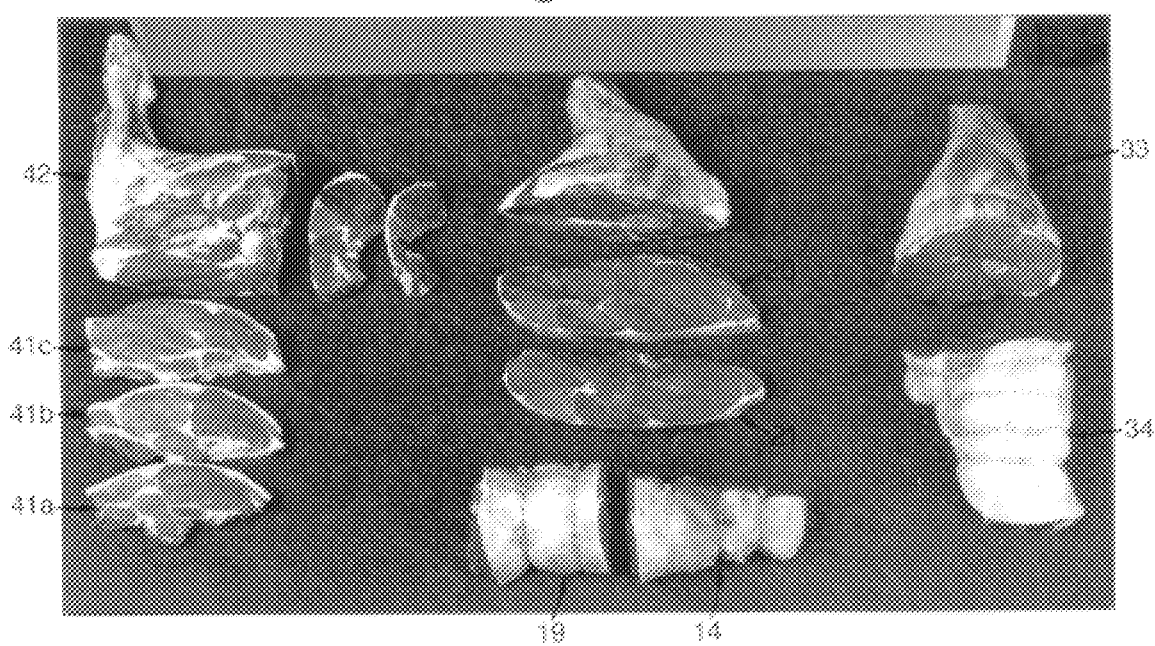
Figure 17A:
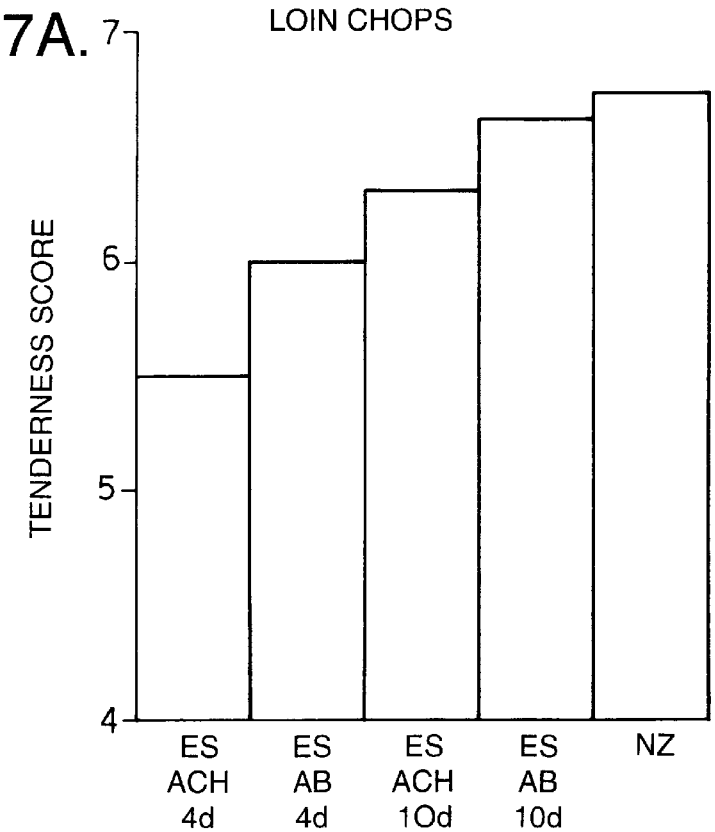
Figure 17B:
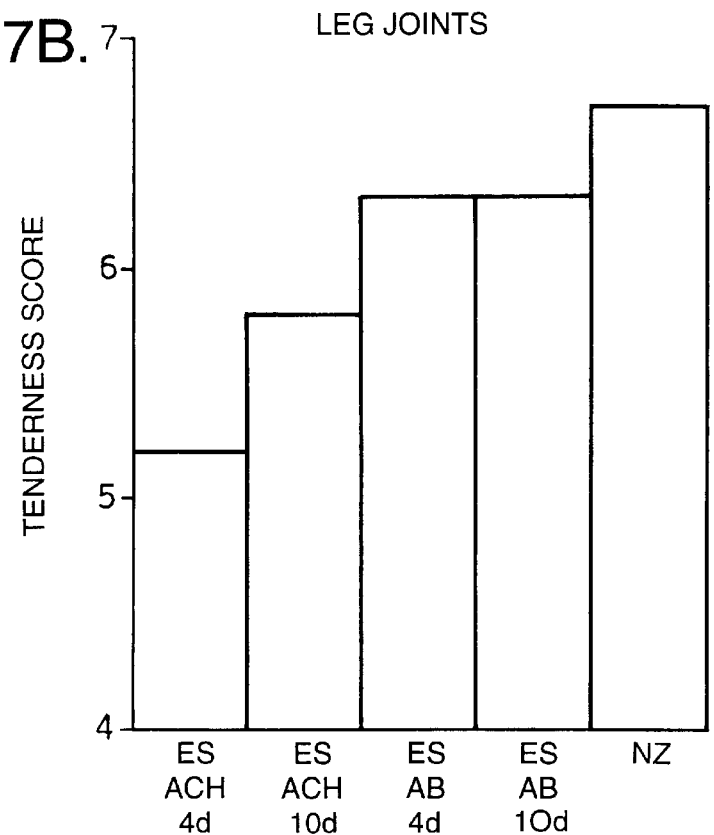
Figure 18:
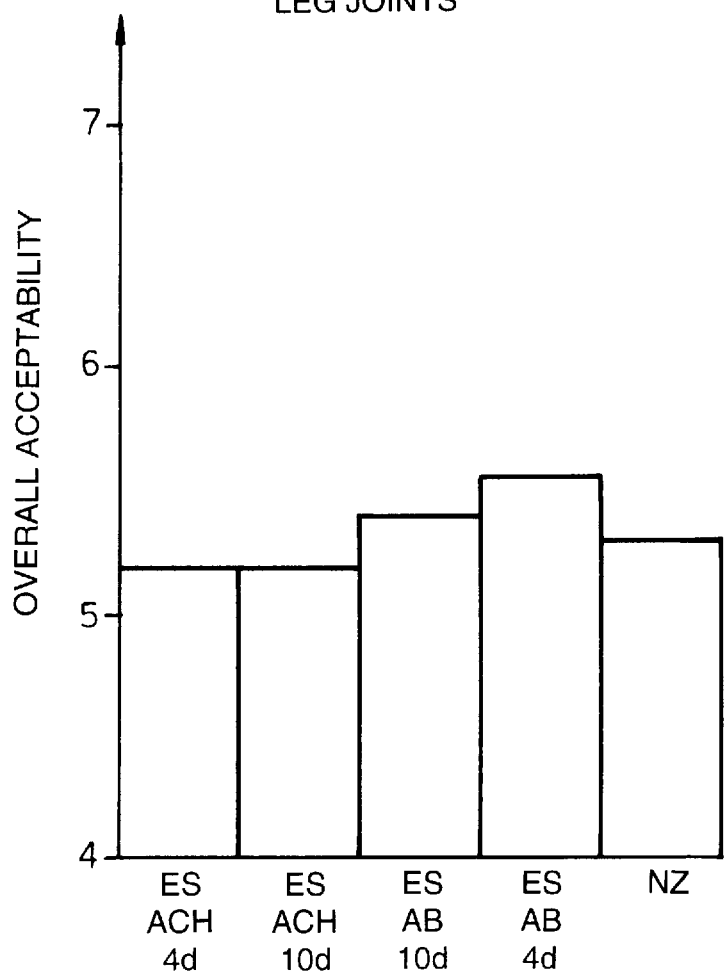
Figure 19:
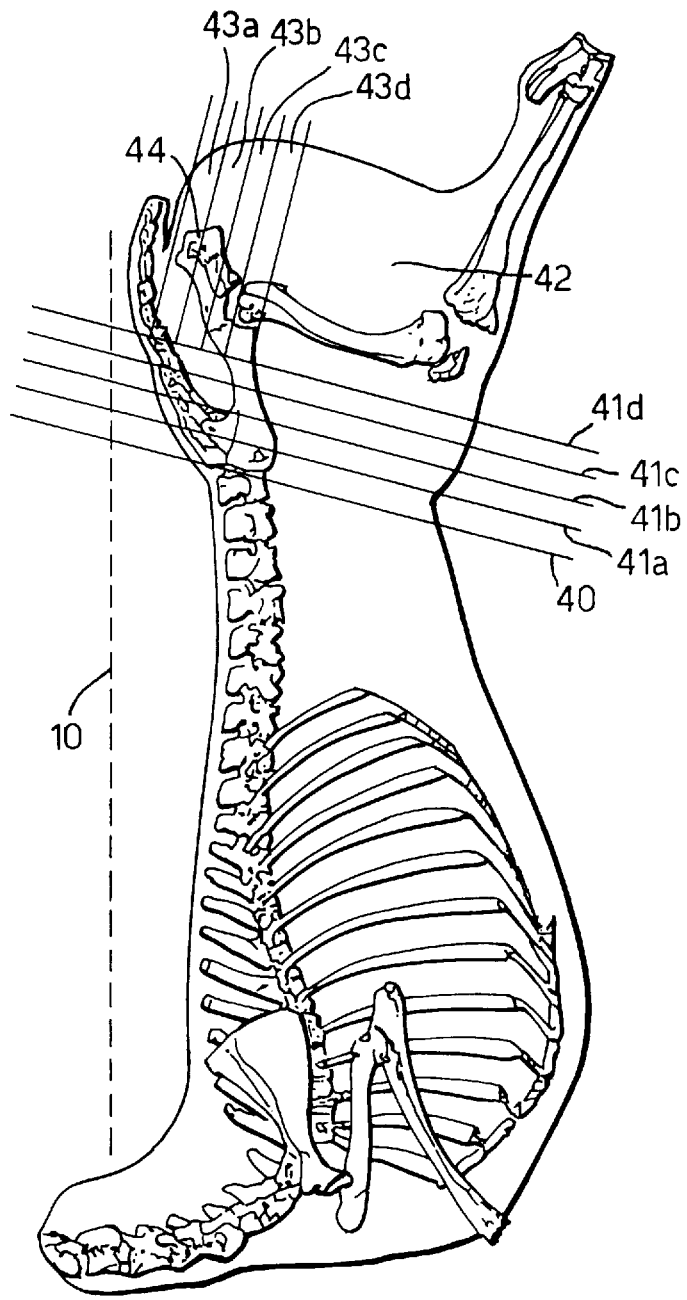
Figure 19A:
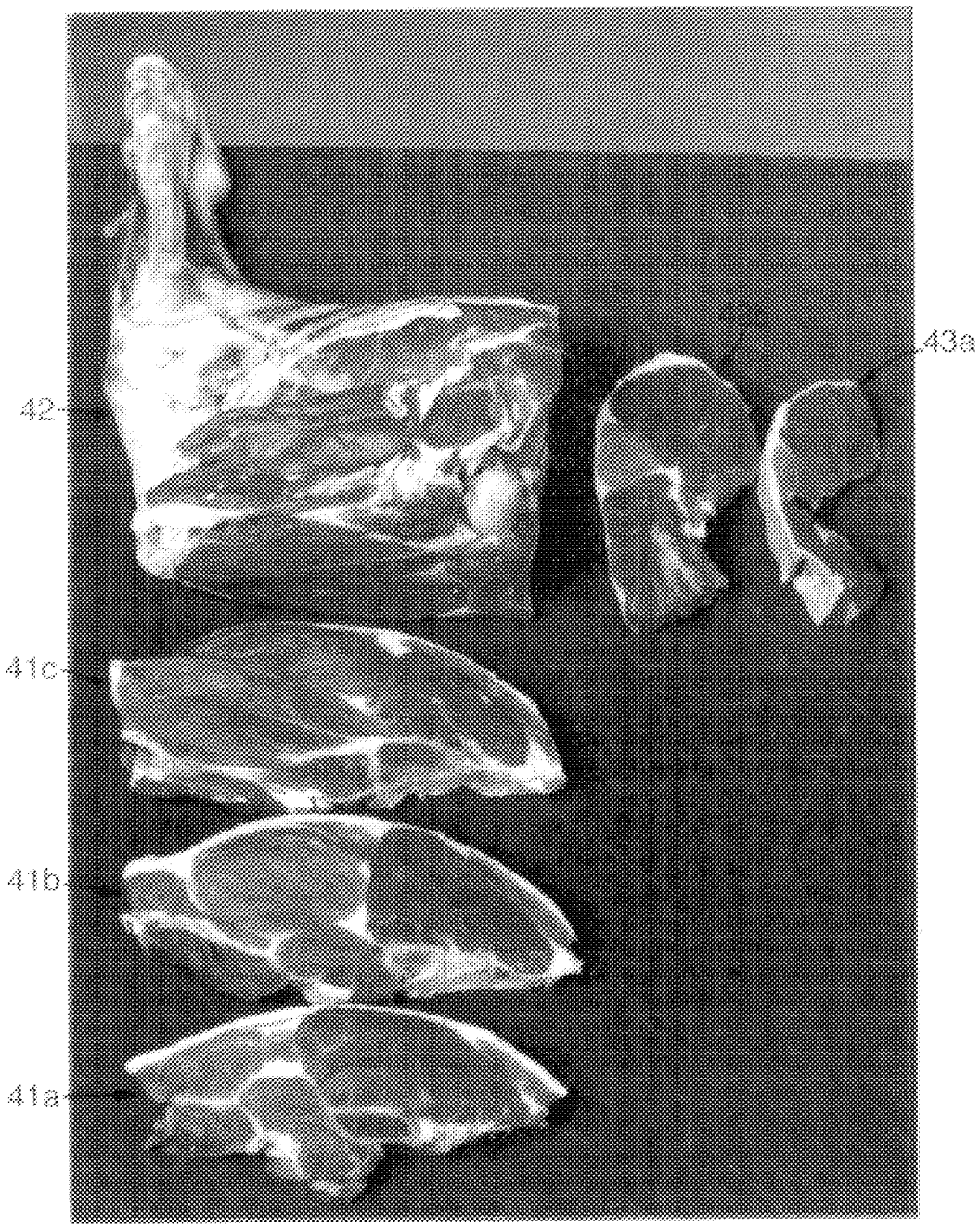

FIGS. 11A–C illustrate a cutting method according to the third and fourth aspects of the invention;

FIG. 11D is a photograph of a lamb carcase which has been handled according to the third and fourth aspects of the invention;

FIG. 12 shows the three cutting methods which are shown in close up in FIGS. 8A, 11D and 19A;

FIG. 13 compares tenderness scores for loin chops;

FIG. 14 compares tenderness scores for leg joints;

FIG. 15 compares overall acceptability scores for loin chops;

FIG. 16 compares overall acceptability scores for joints;

FIGS. 17A and 17B compare tenderness scores for chops and joints which have received high voltage stimulation;

FIG. 18 compares overall acceptability scores for joints which have received high voltage stimulation;

FIG. 19 shows a conventional method of cutting aitch bone hung lamb; and,

FIG. 19A is a photograph of the leg of a lamb carcase which has been aitch bone hung and cut conventionally.

Figure 4:
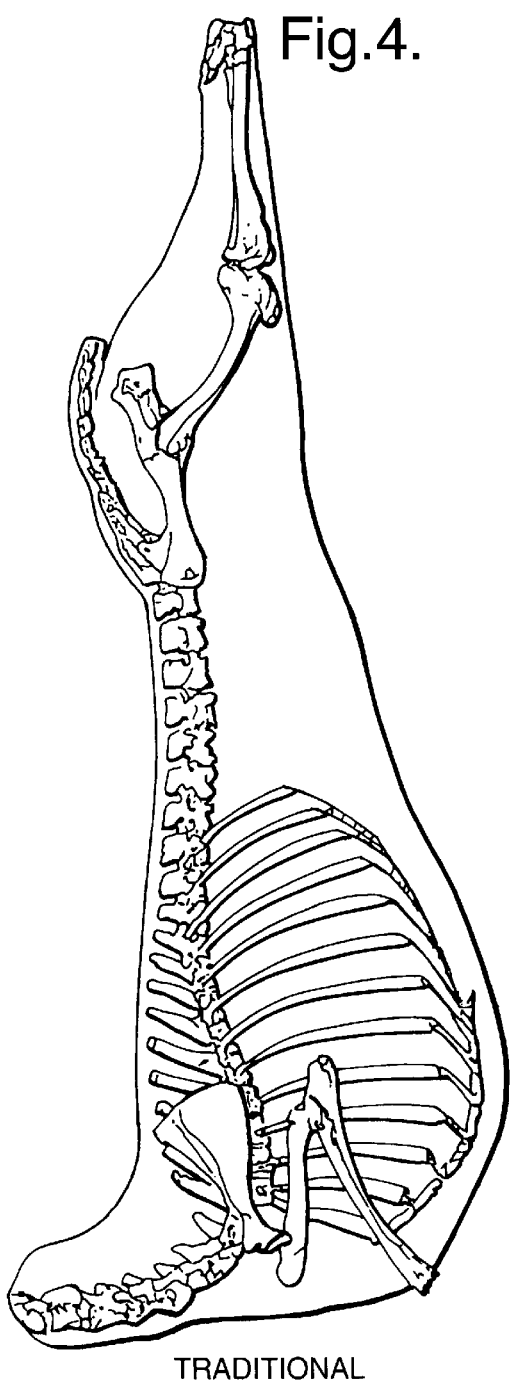
FIG. 4 shows the skeleton structure of a traditionally hung lamb carcase.
Figure 5:
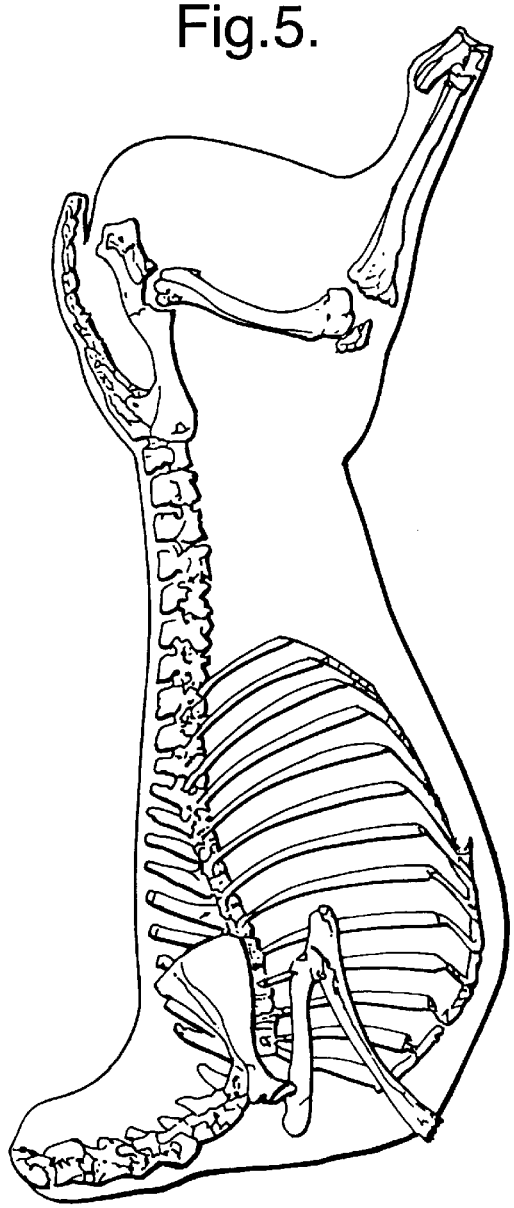
FIG. 5 shows a carcase which has been aitch bone hung and resuspended from the achilles after cooling.
Figure 6:
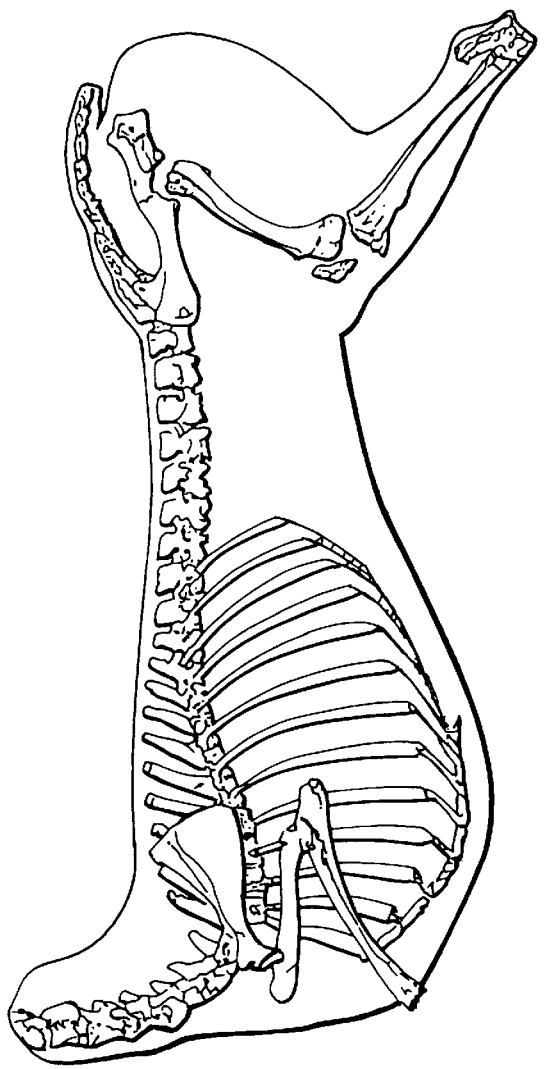
FIG. 6 shows a carcase which has only been aitch bone hung.

FIGS. 4–6 show the skeletal structure of a lamb carcase, and how the outline of the carcase differs from the traditional method of suspension from the achilles or hock joint (FIG. 4) when suspended from the aitch bone (or hip) when hot (FIGS. 5 and 6). In FIG. 5 the carcase was resuspended from the achilles tendon after cooling and this produced a small change in the shape of the hind leg. In FIG. 6, the carcase has been aitch bone suspended throughout. The carcase may be suspended by a hook or may be hung by a cord. The methods described below can be applied to carcases which have been aitch bone suspended throughout or have been aitch bone suspended until cold and then resuspended from the achilles.

Three methods according to the first and second aspects of the present invention will now be described.

Figure 7:
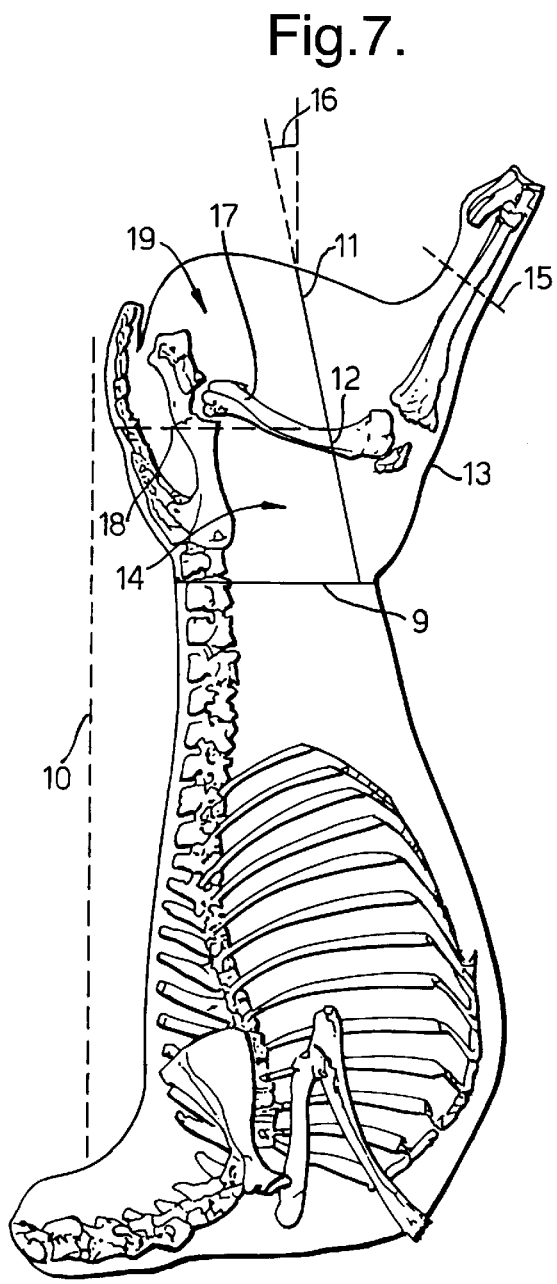
FIG. 7 shows a first cutting method according to the first and second aspects of the invention.

Method 1 (FIG. 7)

(a) The knuckle (13), chump (14) and fillet end (19) are removed from the rest of the carcase by cutting (9) between the last two lumbar vertebrae and substantially at right angles to the back line c–f the carcase (indicated by a dotted line (10) parallel to the dorsal edge of the lumbar vertebrae).

(b) The knuckle (or shank) (13) is removed as illustrated by cutting (11) through a portion (12) of the femur (17) approximately between its middle and distal thirds. The angle (16) of the cut (11) may vary slightly from the angle shown in FIG. 7. In this example, the cut (11) is at approximately 14° to the back line (10). The angle (16) will depend upon the precise shape taken up, by the hind leg, but will always be less than 45°.

(c) The distal end of the tibia, fibula and tarsal bones plus adhering tissue may be removed as indicated at (15).

(d) The tail, aitch bone, sacrum and lumbar vertebrae are removed.

(e) All the bones are removed from the remaining portion of the chump and fillet end using the tunnel boning method where appropriate. Excess fat, connective tissue, discoloured tissue and ragged edges are removed. The joint is then tied securely as follows:

Single lengths of readily available butchers' string (twine) are tied round the circumference of the boneless joint at approximately ¾ inch (19 mm) intervals 90° to the line of the cut (11).

The joint, when fully strung, would typically be divided (18) into two approximately equal parts. However, it could be sold whole or cut into more than two portions according to customer requirements.

Method 2 (FIG. 8)

(a), (b), (c), (d) and first two sentences of (e) as for Method 1.

(e) Two approximately 20 mm thick steaks (20,21) are removed as illustrated from the distal end of the joint by cutting parallel to the line (11) used to remove the knuckle joint. The remaining joint is then tied securely and may then be divided into two or more joints by cutting (18) at right angles to the back line. FIG. 8A is a photograph of parts of a lamb carcase which has been cut as shown in FIG. 8.

Method 3 (FIG. 9)

(a), (b), (c), (d) and first two sentences of (e) as for Method 1.

(e) Three approximately 20 mm thick steaks (20,21,22) are removed as illustrated from the distal end of the joint by cutting parallel to the line (11) used to remove the knuckle joint. The remaining joint is then tied securely and may then be divided into two or more joints by cutting (18) at right angles to the back line.

Alternatively, the entire fillet end and chump may be divided into steaks.

Figure 10A:
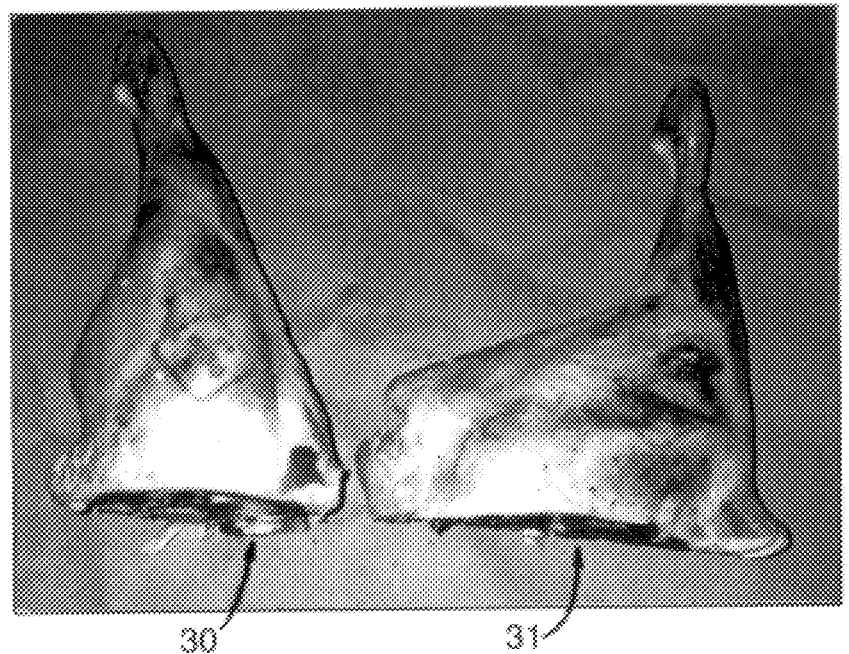
FIG. 10A illustrates a lateral view of lamb legs, in which the lower leg has been conventionally hung, and the upper leg has been-aitch bone hung.
Figure 10B:
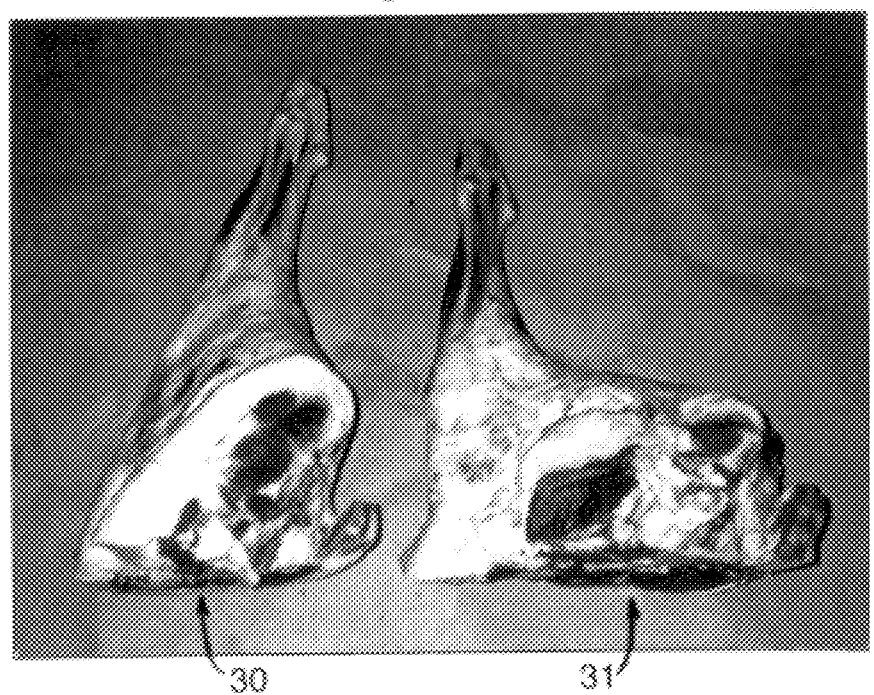
Figure 10B illustrates the medial view of the legs shown in FIG. 10A.

FIGS. 10A and 10B illustrate the altered shape of the hind leg of the lamb as a result of aitch bone hanging compared with conventional hanging from the achilles tendon or hock. FIG. 10A shows a lateral view of a lamb leg (30) which has been conventionally hung (lower joint), and a lamb leg (31) which has been aitch bone hung (upper joint). FIG. 10B shows a medial view of the lamb legs shown in FIG. 10A. As can be seen, the joints have a very different shape.

Method 4

An alternative method of producing leg or leg and chump cuts from an aitch bone suspended carcase is shown in FIGS. 11A–C. This method corresponds to the third and fourth aspects of the present invention.

(1) Remove knuckle, chump and fillet end (FIG. 11A) by cutting (9) between the last two lumbar vertebrae.

(2) The tail, sacrum, pelvic and lumbar vertebral bones are removed using conventional butchery methods (FIG. 12B).

(3) The anterior surface of the leg at the kneecap (patella) (32) (position 1) with the posterior surface (position 2) uppermost is positioned on the edge of a firm surface so that tibia fibula overhangs.

(4) By holding the leg steady at position 2 sufficient downward pressure is applied at position 3 until the whole leg has resumed a more conventional shape (FIG. 12C).

(5) The cut can then be treated in a conventional manner to produce boneless chump chops, bone-in or boneless whole leg, fillet and knuckle joints. The whole leg, fillet and knuckle joints can be tied securely or netted to further enhance their shape.

FIG. 11D is a photograph of parts of a lamb carcase which has been handled and cut as shown in Figures 11A–C. As can be seen, the leg has been cut into two joints 33,34.

FIG. 12 is a photograph showing the three examples of cutting an aitch-bone hung lamb carcase. The prior art cuts shown on the left of FIG. 12 (of which FIG. 19A is a close-up) may be contrasted with the cuts shown in the centre (FIG. 8A—Method 2) and on the right (FIG. 11D—Method 4).

The application of conventional high voltage electrical stimulation (HVES) also proves beneficial. This may be performed either before or after the carcases are aitch bone hung. The HVES characteristics involve 1130 volts peak, 14.28 Hz and an application tine of 90 seconds at 30 minutes after stunning but a number of options around these characteristics might be equally effective.

Ageing (or maturing or conditioning) of the leg and loin cuts also prove beneficial. Alternatively, the entire carcase may be aged. The cuts or carcase are typically aged at 0°–40° C. for between 3 days and 12 weeks. However, tests have shown that an ageing period of 10 days is preferable, as can be seen in FIGS. 13 and 14.

FIGS. 13–18 show how the tenderness and overall acceptability scores can be improved by some of the treatments alone or in combination. The key to these figures is as follows:

| | |
|---|---|
| NES: | No stimulation |
| ES: | High voltage electrical stimulation |
| ACH: | Achilles suspension |
| AB: | Aitch bone suspension |
| 4d: | 4 days ageing |
| 10d: | 10 days ageing |
| NZ: | Chilled New Zealand |

Figure 1:
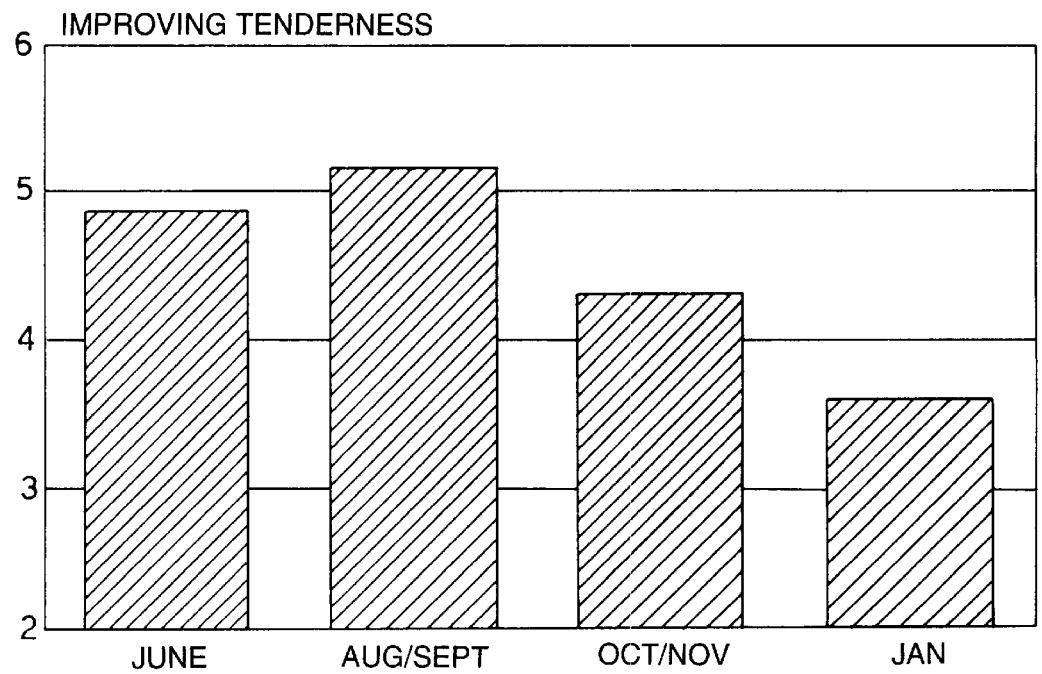
FIG. 1 illustrates the effect of slaughter period on tenderness score.
Figure 2:
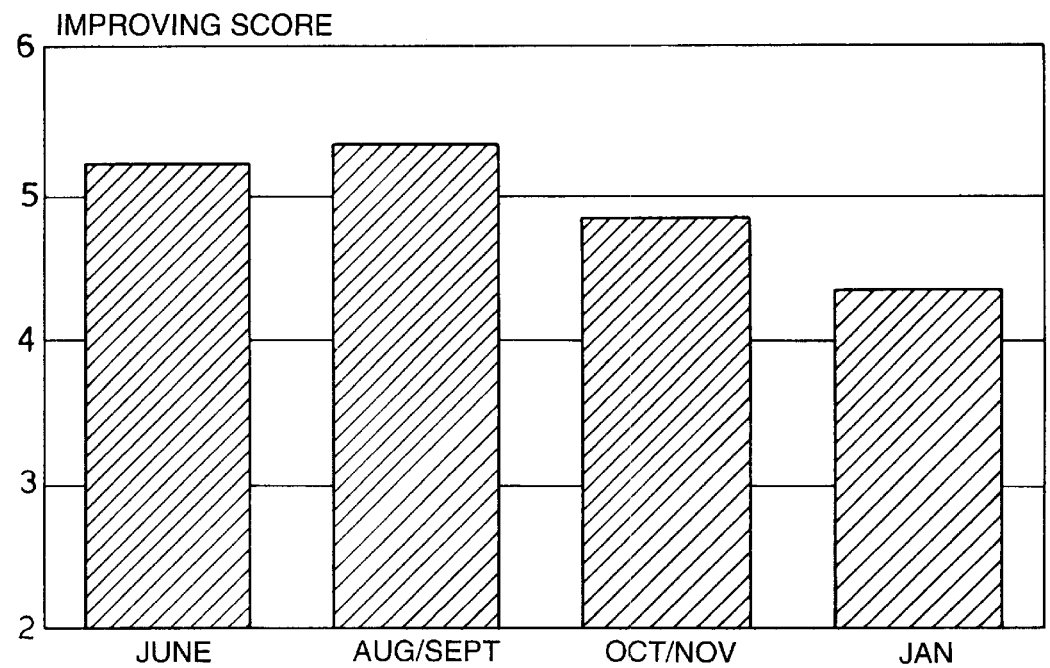
FIG. 2 illustrates the effect of slaughter period on overall acceptability score.
Figure 3:
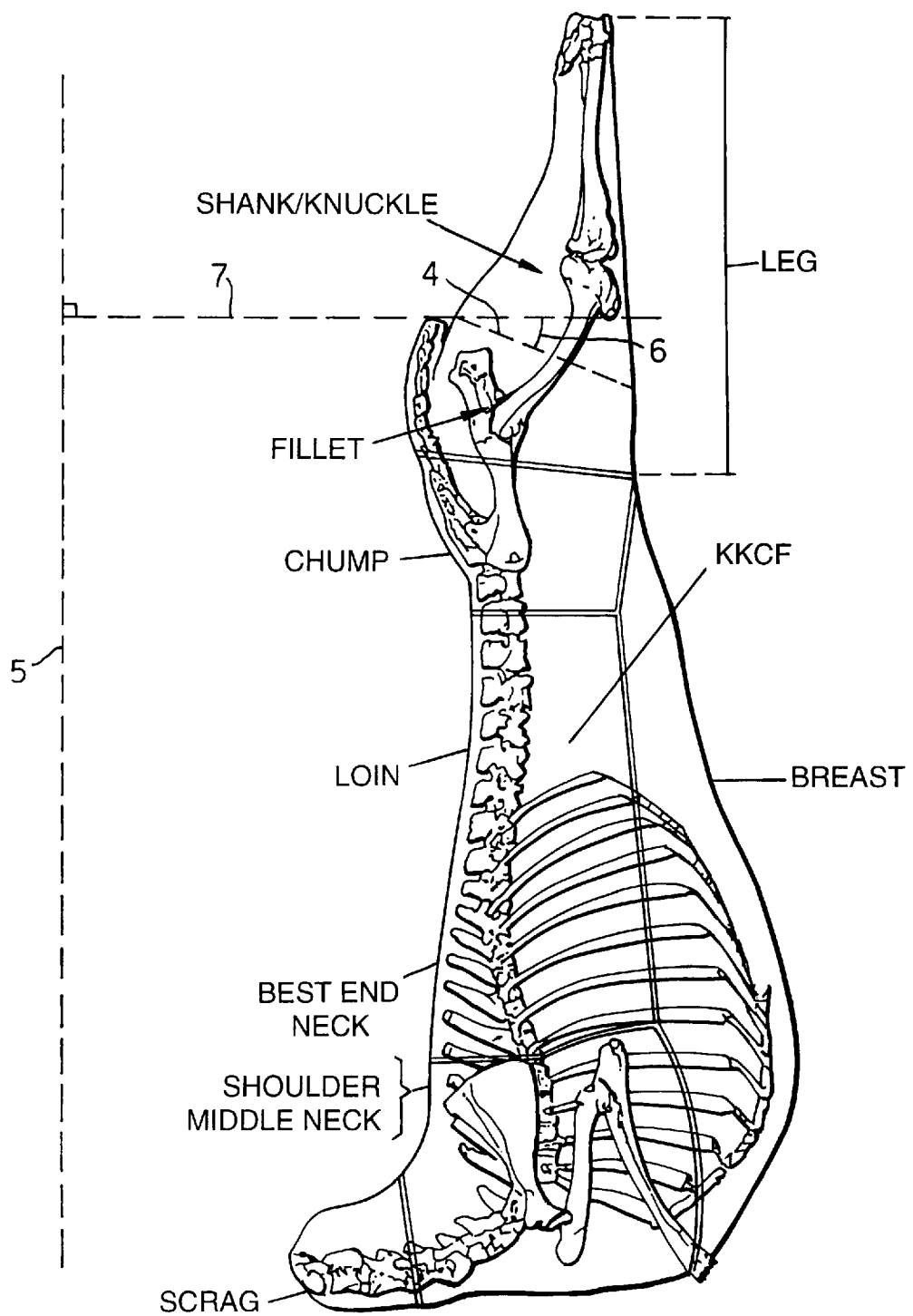
FIG. 3 shows the traditional retail cuts from a conventionally hung carcase.

FIGS. 13–18 show the results from "Hogget" trials on older lamb (slaughtered in January or February) which conventionally shows the deteriorating eating quality shown in FIGS. 1 and 2.

FIGS. 13–16 show the tenderness and overall acceptability scores for loin chops and leg joints which have not been electrically stimulated. It can be seen that aitch bone hung carcases have generally higher scores than achilles tendon hung carcases. It can also be seen that an ageing period of 10 days is preferable.

FIGS. 17 and 18 show similar results for electrically stimulated carcases. It can be seen that electrical stimulation also provides improved scores.

FIGS. 13–18 also illustrate how the treatments compare with the New Zealand samples which have been packaged and chilled under special conditions in transit for several weeks. This NZ material is clearly very tender but is less good on overall acceptability than some of the treatments. This reflects in part the development of off-flavours in the long aged product.

We claim:

1. A method of cutting a carcase which has been hung from its symphysis pubis comprising the steps of:
   (1) removing the knuckle, fillet end and chump from the rest of the carcase; and,
   (2) separating the knuckle from the fillet end and chump by cutting at an angle of less than 45° to the back line of the carcase.

2. A method according to claim 1, wherein the knuckle, fillet end and chump are removed from the rest of the carcase by a cut between two vertebrae substantially at right angles to the backline of the carcase.

3. A method according to claim 1, wherein the knuckle is separated from the fillet end and chump by cutting through the femur at a position between its middle and distal thirds.

4. A method according to claim 1, wherein the angle of the cut separating the knuckle from the fillet end and chump is between 10 and 20 degrees to the backline of the carcase.

5. A method according to claim 1, further comprising removing the distal end of the tibia, fibula and tarsal bones plus adhering tissue.

6. A method according to claim 1, further comprising removing the tail, aitch bone, sacrum and lumbar vertebrae.

7. A method according to claim 1, further comprising removing the remaining bones from the chump and fillet end using tunnel boning where appropriate.

8. A method according to claim 1, further comprising removing one or more steaks from the distal end of the joint by cutting substantially parallel to the line of the cut used to remove the knuckle joint.

9. A method according to claim 1, further comprising tying up the joint formed by the chump and fillet end and separating into two or more parts.

10. A method according to claim 1 further comprising allowing the carcase, or cuts derived from the carcase to age for at least 72 hours from the time of slaughter.

11. A method according to claim 10, wherein the carcase or cuts derived from the carcase are aged for between 4 and 10 days.

12. A method according to claim 1 further comprising applying high voltage stimulation to the carcase.

13. A method of post slaughter handling and cutting a carcase comprises the steps of:

(1) hanging the carcase from its symphysis pubis;

(2) removing the knuckle, fillet end and chump from the rest of the carcase; and, (3) separating the knuckle from the fillet end and chump by cutting at an angle of less than 45° to the back line of the carcase.

14. A method according to claim 13, wherein the knuckle, fillet end and chump are removed from the rest of the carcase by a cut between two vertebrae substantially at right angles to the backline of the carcase.

15. A method according to claim 13, wherein the knuckle is separated from the fillet end and chump cutting through the femur at a position between its middle and distal thirds.

16. A method according to claim 13, wherein the angle of the cut separating the knuckle from the fillet end and chump is between 10 and 20 degrees to the backline of the carcase.

17. A method according to claim 13, further comprising removing the distal end of the tibia, fibula and tarsal bones plus adhering tissue.

18. A method according to claim 13, further comprising removing the tail, aitch bone, sacrum and lumbar vertebrae.

19. A method according to claim 13, further comprising removing the remaining bones from the chump and fillet end using tunnel boning where appropriate.

20. A method according to claim 13, further comprising removing one or more steaks from the distal end of the joint by cutting substantially parallel to the line of the cut used to remove the knuckle joint.

21. A method according to claim 13, further comprising tying up the joint formed by the chump and fillet end and separating into two or more parts.

22. A method according to claim 13, further comprising allowing the carcase, or cuts derived from the carcase to age for at least 72 hours from the time of slaughter.

23. A method according to claim 13, further comprising applying high voltage stimulation to the carcase.

24. A method of post-slaughter handling and cutting a carcase which has been hung from its symphysis pubis comprising the steps of:

(1) removing the leg and chump from the rest of the carcase;

(2) removing at least the pelvic bones;

(3) straightening the leg.

25. A method according to claim 24, further comprising removing the tail, sacrum and lumbar vertebral bones.

26. A method according to claim 24, wherein the leg is straightened by positioning the anterior surface of the leg at the kneecap on the edge of a firm surface with the posterior surface uppermost so that tibia fibula overhangs the firm surface, holding the posterior surface steady and applying pressure to the end of the leg until the whole leg has straightened.

27. A method according to claim 24, further comprising treating the cut in a conventional manner to produce boneless chump chops, bone in or boneless whole leg, fillet or knuckle joints.

28. A method according to claim 24, further comprising allowing the carcase, or cuts derived from the carcase to age for at least 72 hours from the time of slaughter.

29. A method according to claim 24, further comprising applying high voltage stimulation to the carcase.

30. A method of post slaughter handling and cutting a carcase comprises the steps of:

(1) hanging the carcase from its symphysis pubis;

(2) removing the leg and chump from the rest of the carcase;

(3) removing at least the pelvic bones; and (4) straightening the leg.

31. A method according to claim 30, further comprising removing the tail, sacrum and lumbar vertebral bones.

32. A method according to claim 30, wherein the leg is straightened by positioning the anterior surface of the leg at the kneecap on the edge of the firm surface with the posterior surface uppermost so that tibia fibula overhangs the firm surface, holding the posterior surface steady and applying pressure to the end of the leg until the whole leg has straightened.

33. A method according to claim 30, further comprising treating the cut in a conventional manner to produce boneless chump chops, bone in or boneless whole leg, fillet or knuckle joints.

34. A method according to claim 30, further comprising allowing the carcase, or cuts derived from the carcase to age for at least 72 hours from the time of slaughter.

35. A method according to claim 30, further comprising applying high voltage stimulation to the carcase.

* * * * *